US006632850B2

(12) United States Patent
Hughes et al.

(10) Patent No.: US 6,632,850 B2
(45) Date of Patent: Oct. 14, 2003

(54) MICROPOROUS MATERIALS AND METHODS OF MAKING THE SAME

(75) Inventors: Shannon Kay Hughes, Apple Valley, MN (US); Robert Steven Kody, Minneapolis, MN (US); James Stephen Mrozinski, Oakdale, MN (US); Myles Lee Brostrom, West Lakeland Township, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 115 days.

(21) Appl. No.: 09/825,917

(22) Filed: Apr. 4, 2001

(65) Prior Publication Data

US 2003/0036577 A1 Feb. 20, 2003

(51) Int. Cl.$^7$ ................................................. C08J 9/04
(52) U.S. Cl. ........................... 521/82; 521/86; 521/91; 521/93; 521/94; 521/97; 521/142; 521/143; 428/500
(58) Field of Search .............................. 521/82, 86, 91, 521/93, 94, 97, 142, 143; 428/500

(56) References Cited

U.S. PATENT DOCUMENTS

| | | |
|---|---|---|
| 4,539,256 A | 9/1985 | Shipman |
| 4,726,989 A | 2/1988 | Mrozinski |
| 5,134,174 A | 7/1992 | Xu et al. |
| 5,176,953 A | 1/1993 | Jacoby et al. |
| 5,231,126 A | 7/1993 | Shi et al. |
| 5,317,035 A | 5/1994 | Jacoby et al. |
| 5,594,070 A | 1/1997 | Jacoby et al. |
| 5,681,922 A | 10/1997 | Wolfschwenger et al. |

FOREIGN PATENT DOCUMENTS

| | | |
|---|---|---|
| EP | 0 309 136 A2 | 3/1989 |
| EP | 0 492 942 A2 | 1/1992 |
| EP | 0 632 095 A2 | 1/1995 |
| EP | 0 790 262 A1 | 8/1997 |
| EP | 0 865 909 A1 | 9/1998 |
| EP | 0 865 910 A1 | 9/1998 |
| EP | 0 865 911 A1 | 9/1998 |
| EP | 0 865 912 A1 | 9/1998 |
| EP | 0 865 913 A1 | 9/1998 |
| EP | 0 865 914 A1 | 9/1998 |
| EP | 0 887 375 A1 | 12/1998 |
| EP | 0 967 671 A2 | 12/1999 |
| GB | 2 251 205 A | 7/1992 |
| HU | 209 132 A | 4/1992 |
| JP | 9-3226 | 1/1997 |

OTHER PUBLICATIONS

Moore, Jr., Edward P.; *Polypropylene Handbook*, "Polymerization, Characterization, Properties, Processing, Applications", Hanser Publishers, Munich, Vienna, New York, Hanser/Gardner Publications, Inc., Cincinnati, (1996), pp. 134–138, 166–167, and 171–175.

Varga, J., Ehrenstein, G. W.; "Beta–Modification of Isotatic Polypropylene", Polyporpylene: An A–Z Reference, Kluwer Publishers, 1999, Dordrecht., pp. 51–59.

Mubarak, Y., Martin, P. J., Harkin–Jones, E.; "Effect of Nucleating Agents and Pigments on Crystallisation, Morphology, and Mechanical Properties of Polypropylen", *Plastics, Rubber and Composites*, vol. 29, No. 7, 2000, pp. 307–315.

F. Chu, T. Yamaoka, H. Ide and Y. Kimura; "Microvoid Formation Process During The Plastic Deformation of $\beta$–form Polypropylene", *Polymer*, vol. 35, No. 16, 1994, pp. 3442–3448.

F. Chu, T. Yamaoka and Y. Kimura; "Crystal Transformation and Micropore Formation During Uniaxial Drawing of $\beta$–form Polypropylene Film", *Polymer*, vol. 36, No. 13, 1995, pp. 2523–2530.

K. Nagarajan, K. Levon and A. S. Myerson; "Nucleating Agents in Polypropylene", *Journal of Thermal Analysis and Calorimetry*, vol. 59, 2000, pp. 497–508.

L. Jinjiang, W. Xiufen and G. Qipeng; "The $\beta$–Crystalline Form of wollastonite–Filled Polypropylens", *Journal of Applied Polymer Science*, vol. 41, 1990, pp. 2829–2835.

N. Ikeda, T. Kobayashi; "NJ–Star NU–100: A Novel $\beta$–Nuleator for Polypropylene", Polypropylens '96 World Congress, Sep. 18–20, 1996, Zurich, Switzerland, pp. 1–10.

G. Shi, X. Zhang, Z. Qiu; "Crystallization Kinetics of $\beta$–Phase Poly(Propylene)", *Makromol. Chem.*, vol. 193, 1992, pp. 583–591.

R. A. Shanks and B. E. Tiganis; "Nucleating Agents For Thermoplastics", Plastics Additives: An A–Z Reference, Published by Chapman & Hall, London, 1998, pp. 465–470.

V. H. J. Leugering; "Einfluβ der Kristallstruktur und der Uberstruktur auf einige Eigenschaften vol Polypropylen", *Die Makromolekulare Chemie*, vol. 109, (1967) pp. 204–216, (Nr. 2482).

A. Turner–Jones and A. J. Cobbold; "The $\beta$–Crystalline Form of Isotatic Polypropylene" Polymer Letters, vol. 6, 1968, pp. 539–546.

A. Turner–Jones, J. M. Aizlewood and D. R. Beckett; "Crystalline Forms of Isotactic Polypropylene" *Makromol. Chem,.* vol. 75, 1964, pp. 134–158.

J. Varga; "$\beta$–Modification of Polypropylene and Its Two–Component Systems", *Journal of Thermal Analysis*, vol. 35, (1989) pp. 1891–1912.

(List continued on next page.)

Primary Examiner—John M. Cooney, Jr.
(74) Attorney, Agent, or Firm—Melanie G. Gover

(57) ABSTRACT

Microporous materials and articles are disclosed. The microporous materials contain a crystallizable propylene-containing polymer, a beta-nucleating agent, and a diluent that is miscible with the polymer at a temperature above the melting temperature of the polymer and that phase separates from the polymer at a temperature below the polymer crystallization temperature. The invention is also directed to methods of forming the microporous material using thermal induced phase separation and subsequent processing.

18 Claims, 1 Drawing Sheet

OTHER PUBLICATIONS

Figure 1:
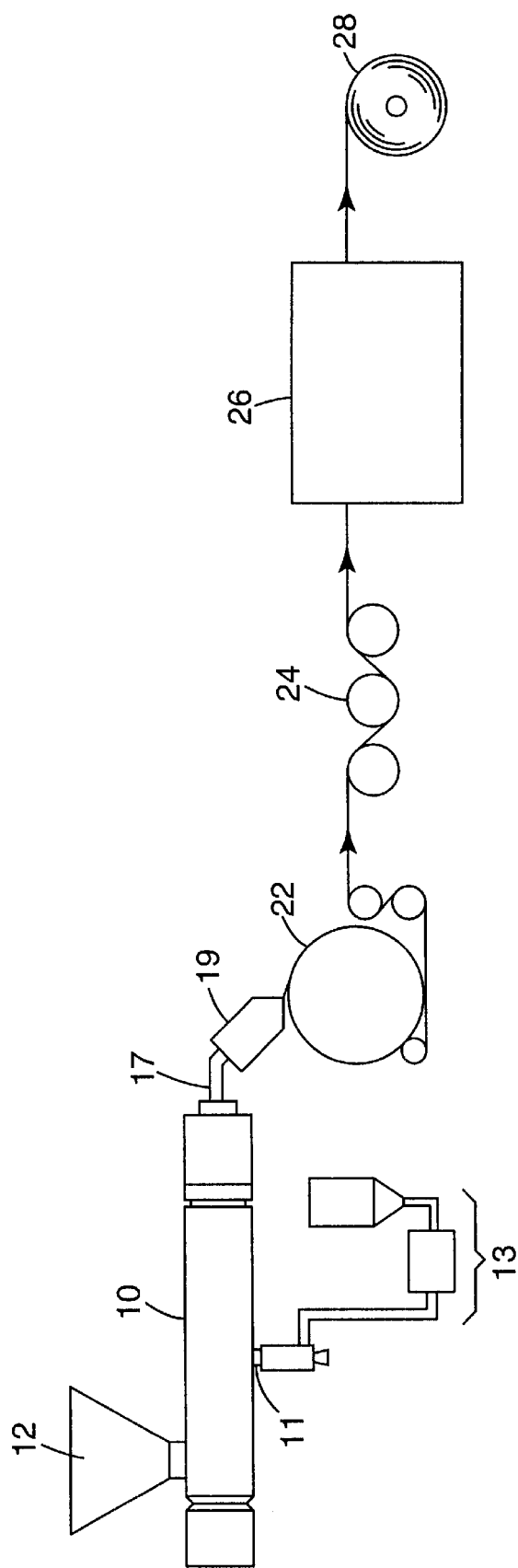

J. Varga, I. Mudra and G. Ehrenstein; "Crystallization and Melting of β–Nucleated Isotactic Polypropylene", *Journal of Thermal Analysis and Calorimetry*, vol. 56, 1999, pp. 1047–1057.

J. Varga, I. Mudra and G. Ehrenstein; "Highly Active Thermally Stable β–Nucleating Agents for Isotactic Polypropylene", *Journal Applied Polymer Science*, vol. 74, 1999, pp. 2357–2368.

J. Varga; "Melting Memory Effect of the β–Modification of Polypropylens", *Journal of Thermal Analysis*, vol. 31, 1986, pp. 165–172.

G. Natta, P. Corradini, and M. Cesari; Rendiconti. Della Accademia. Nazionale Dei Lincei, vol. 21, No. 6, pp. 365–372, (1956).

MICROPOROUS MATERIALS AND METHODS OF MAKING THE SAME

FIELD OF THE INVENTION

The present invention relates to microporous materials, including microporous materials formed by crystallization of a propylene-containing polymer in the presence of a beta-nucleating agent. The invention also relates to methods of forming microporous materials and articles made using the microporous materials.

BACKGROUND

Microporous materials are used in a wide range of applications, including filters, breathable membranes, and absorbent articles. Numerous methods exist for making microporous articles. However, a need exists for improved microporous materials and methods of making the microporous materials.

SUMMARY OF THE INVENTION

The present invention is directed to microporous materials suitable for use in a wide range of applications, such as oil and water-absorbing films, battery separators, and diffusion barriers. The microporous materials contain a combination of a crystallizable propylene-containing polymer and a beta-nucleating agent. A diluent material, present during formation of the microporous materials, is also typically present in the microporous materials. The diluent material is miscible with the polymer at a temperature above the melting point of the polymer, yet phase separates from the polymer at a temperature below the polymer crystallization temperature. The crystallizable propylene-containing polymer can be polypropylene, a propylene-containing copolymer, or a mixture of thermoplastic polymers including polypropylene. The diluent is, for example, mineral oil. The beta-nucleating agent can be, for example, quinacridone colorants (such as gamma quinacridone), dicarboxylic acid salts of metals of Group IIA of the periodic table.

The microporous materials of the invention are formed using a thermally induced phase separation (TIPS) method. This method of making the microporous materials typically includes melt blending the crystallizable propylene-containing polymer, the beta-nucleating agent, and the diluent to form a melt mixture. After creating this melt mixture it is formed into a shaped article and cooled to a temperature at which the beta-nucleating agent nucleates crystals of the propylene-containing polymer and causes phase separation between the polymer and diluent. In this manner a material is formed that comprises an aggregate of a plurality of crystallized propylene-containing polymer particles in the diluent compound.

Following formation of the particles of the polymer, the porosity of the material is increased by one or both of stretching the shaped article in at least one direction and removing at least a part of the diluent. This step results in separation of adjacent particles of propylene-containing polymer from one another to provide a network of interconnected micropores. This step also permanently attenuates the propylene-containing polymer to form fibrils connecting the plurality of particles, imparting strength and porosity to the article. The diluent compound can be removed from the material either before or after stretching. In certain embodiments, the diluent compound is not removed.

The use of beta-nucleating agents in accordance with the present invention permits the manufacture of a wide variety of microporous materials previously not possible. They permit microporous films to be made, and crystallized, over a higher and broader range of temperatures than are normally accessible. These conditions can produce films having different characteristics than films made at lower temperatures. In addition, according to the present invention, only small amounts of the beta-nucleating agents are needed to make microporous materials. Accordingly, materials having favorable color properties, including a lack of color, can be formed using the beta-nucleating agents of the invention because the color of the beta-nucleating agent does not interfere with the desired color due to its low concentration.

The polymer particles form in the presence of a beta-nucleating agent such that the number of fibrils connecting the particles per unit volume can be significantly increased over the number of fibrils that would exist per unit volume if no beta-nucleating agent were present. If no beta-nucleating agent were present, fewer and larger spherulites would slowly form, thus providing fewer fibrils resulting in a film with little or no strength. In the present invention, as the melt mixture cools in the presence of a beta-nucleating agent, the polymer phase separates quickly from the diluent and forms more and smaller spherulites, and more fibrils. The fibril lengths in the microporous article are typically increased and the tensile strength enhanced, and the microporous material typically has significantly improved stretchability compared to forming the microporous material without a beta-nucleating agent.

Other features and advantages of the invention will be apparent from the following detailed description of the invention and the claims. The above summary of principles of the disclosure is not intended to describe each illustrated embodiment or every implementation of the present disclosure. The detailed description that follows more particularly exemplifies certain embodiments utilizing the principles disclosed herein.

FIGURE

The invention will be more fully explained with reference to the following drawing, in which:

FIG. 1 is a schematic illustration of a system for forming a microporous material in accordance with the invention.

While principles of the invention are amenable to various modifications and alternative forms, specifics thereof have been shown by way of example in the drawing and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION OF THE INVENTION

The present invention is directed to improved microporous materials and articles made using thermally induced phase separation (TIPS). The invention is also directed to methods of making the improved materials and articles. The improved materials of the invention include a crystallizable propylene-containing polymer plus a beta-nucleating agent. A diluent is used to form the microporous materials, and at least some diluent is typically present in the finished microporous materials and articles incorporating the finished materials.

The articles and materials of the present invention have a microporous structure characterized by a multiplicity of spaced (i.e., separated from one another), randomly dispersed particles of propylene-containing polymer connected by fibrils, with beta-nucleating agent in the interior of the particles. This structure provides for advantageous porosity, strength, and stretchability of the microporous materials.

Various terms are used in the specification and claims herein that may require explanation beyond their generally understood meanings. Thus, it will be understood that, when referring to the propylene-containing polymer as being "crystallized," this means that it is at least partially crystalline. It will be further understood that the term "thermoplastic polymer" refers to conventional polymers that are melt processable under ordinary melt processing conditions. The term "thermoplastic polymer" is not intended to include polymers that may be thermoplastic but are rendered melt processable only under extreme conditions. The term "diluent" refers to a material that (1) is mixable with a polymeric material, (2) is able to form a solution with a polymeric material when the mixture is heated above crystallization temperature of the polymeric material, and (3) phase separates from that solution when the solution is cooled below the crystallization temperature of the polymeric material.

The term "melting temperature" refers to the temperature at which the polymer in a blend that contains polymer, diluent, and beta-nucleating agent will melt and at which the beta-nucleating agent may melt. The term "crystallization temperature" refers to the temperature at which the polymer in the blend will crystallize. The term "equilibrium melting point" refers to the commonly accepted melting temperature of the pure polymer, as may be available in published references.

The melting and crystallization temperature of a thermoplastic polymer, in the presence of a diluent and a beta-nucleating agent, is influenced by both a phase equilibrium and a dynamic effect. At equilibrium between liquid and crystalline polymer phases, thermodynamics require that the chemical potentials of the polymer repeating unit in the two phases be equal. The temperature at which this condition is satisfied is referred to as the melting temperature, which will depend upon the composition of the melt mixture.

The beta-nucleating agent of the invention serves to initiate a greater number of crystallization sites, thereby speeding up the crystallization process, than obtained without a nucleation system. In addition, the beta-nucleating agents of the invention provide enhanced crystallization over a material not containing a nucleating system, even in the presence of melt additives, that may interfere with crystallization when using dissolution-type nucleating agents such as, for example, dimethyldibenzylidene sorbitol.

The crystallization temperature and melting temperature are typically equivalent at equilibrium. However, at non-equilibrium conditions, which are normally the case, the crystallization temperature and melting temperature depend on the external cooling rate and heating rate, respectively. Consequently, the terms "melting temperature" and "crystallization temperature," when used herein, are intended to include the equilibrium effect (i.e., the polymer/diluent system melts and crystallizes at the same temperature) of the diluent and beta-nucleating agent as well as the dynamic effect of the rate of heating or cooling.

The specific ingredients of the microporous material, as well as methods of making the material will now be discussed in additional detail.

A. Propylene-containing Polymer

The polymer component of the microporous articles is a crystallizable propylene-containing material. "Propylene-containing" refers to polypropylene, copolymers containing propylene mer units, and mixtures of thermoplastic polymers that include polypropylene. The polymer is selected such that it provides good TIPS functionality while having suitable properties in the finished article, such as strength and handle ability. The microporous articles typically contain from about 30 to about 80 parts by weight of the crystallizable propylene-containing polymer, more typically from about 40 to 70 parts by weight of the polymer, and even more typically from about 50 to 65 parts by weight of the polymer based upon the total weight of polymer and diluent in the microporous material (measured prior to any removal of diluent from the microporous material).

Crystallizable thermoplastic polymers suitable for use in a polymer mixture that includes polypropylene within the scope of the present invention are typically melt processable under conventional processing conditions. That is, on heating, they will easily soften and/or melt to permit processing in conventional equipment, such as an extruder, to form a sheet. Crystallizable polymers, upon cooling their melt under controlled conditions, spontaneously form geometrically regular and ordered chemical structures. Preferred crystallizable polymers for use in the present invention have a high degree of crystallinity and also possess a tensile strength greater than about 70 $kg/cm^2$ or 1000 psi.

Examples of suitable crystallizable thermoplastic polymers include addition polymers, such as polyolefins. Useful polyolefins preferably include polymers of ethylene, but also may include 1-octene, styrene, and the like, the copolymers of two or more such olefins that may be polymerized to contain crystalline and amorphous segments, and mixtures of stereo-specific modification of such polymers, e.g., mixtures of isotactic polypropylene and atactic polypropylene, or of isotactic polystyrene and atactic polystyrene.

B. Beta-Nucleating Agent

Beta-nucleating agents are materials present in a crystallizable polymer melt as a foreign body. When the polymer cools below its crystallization temperature, the loose coiled polymer chains orient themselves about the foreign body into regions of a three-dimensional crystal pattern mixed with amorphous polymer. In a thermally induced phase separated system, the regions separate from the diluent to form a material having at least a polymer phase and a diluent phase.

Beta-nucleating agents are nucleating agents that preferentially cause the formation of a beta crystal structure in polymer regions containing polypropylene. A polypropylene melt can crystallize into one of three forms: alpha (having a monoclinic structure), beta (having an hexagonal structure) or gamma (having an orthorhombic structure). Polypropylene usually crystallizes into a semi-crystalline structure having alpha crystals. However, polypropylene melt containing beta-nucleating agents can form a semi-crystalline film having a significant portion of beta crystals. This allows for, among other things, the creation of porous films by either removing the beta crystals or by separating them from the neighboring alpha crystals.

Surprisingly it was discovered that beta-nucleating agents work as nucleating agents in the presence of melt additives in the thermally induced phase separated system of the present invention. Typically, a dissolution nucleating agent does not work in a phase separation system in the presence of melt additives. Their presence advantageously affects separation of polymer regions containing polypropylene segments from diluent during crystallization separation. Generally lower amounts of nucleating agent are necessary to achieve desired microporous film properties in the present invention than in other known beta-nucleating systems. Also, crystallization can occur over a broader range of temperatures. This allows different combinations of polymers and diluents that result in more processing latitude. Although the presence of at least one beta-nucleating agent is advantageous during the crystallization separation of polypropylene-containing polymeric materials, the resulting beta-crystals are not necessary to achieve porosity. Indeed, the beta crystals in polypropylene films of the invention that appear in the cast microporous film are converted to the alpha form under subsequent application of heat and stretching.

The use of a beta-nucleating agent in accordance with the present invention substantially accelerates the crystallization of the polymer over that occurring when no nucleating agent is present. This in turn results in a film with a more uniform, stronger microstructure because of the presence of reduced-sized spherulites. The smaller, more uniform microstructure has an increased number of tie fibrils per unit volume and allows for greater stretching of the materials so as to provide higher void porosity and greater tensile strength than heretofore achievable.

Beta-nucleating agents provide enhanced properties when used with propylene-containing polymeric systems. They allow smaller quantities of nucleating agent to be added to the melt mixture than most conventional nucleating agent used in the thermally induced phase separated process of creating porous films. This lower level of nucleating agent is advantageous for various reasons, including the characteristic that it permits greater control over the color of the finished material. Color control is advantageous when the films are used in, for example, humidity-sensing or consumer-wipe applications. Many nucleating agents are available in a variety of strong colors, and the ability to use lower levels of the beta-nucleating agent gives greater control over the final color of the finished material so that the beta-nucleating agent color need not adversely effect the desired color.

The amount of beta-nucleating agent must be sufficient to initiate crystallization of the propylene-containing polymer at enough nucleation sites to create a suitable porous microporous material. For polymer systems containing polypropylene segments this amount can typically be less than 0.1 parts by weight of the crystallizable propylene-containing polymer, and even more typically less than 0.05 parts by weight of the crystallizable propylene-containing polymer. In specific implementations the amount of beta-nucleating agent is from about 0.002 to 0.07 parts by weight of the crystallizable propylene-containing polymer, even more typically from about 0.002 to 0.03 parts by weight of the crystallizable propylene-containing polymer.

Useful beta-nucleating agents are those generally able to cause the formation of beta crystals in polypropylene segments. These include, for example, gamma quinacridone, aluminum salt of quinizarin sulphonic acid, dihydroquinoacridin-dione and quinacridin-tetrone, triphenenol ditriazine, two component initiators such as calcium carbonate and organic acids or calcium stearate and pimelic acid, calcium silicate, dicarboxylic acid salts of metals of the Group IIA of the periodic table, delta-quinacridone, diamides of adipic or suberic acids, calcium salts of suberic or pimelic acid, different types of indigosol and cibantine organic pigments, quiancridone quinone, N',N'-dicyclohexil-2,6-naphthalene dicarboxamide (NJ-Star NU-100, ex New Japan Chemical Co. Ltd.), and antraquinon red and bis-azo yellow pigments. Preferred agents include gamma-quinacridone, a calcium salt of suberic acid, a calcium salt of pimelic acid and calcium and barium salts of polycarboxilic acids.

The beta-nucleating agent employed in the present invention serves the important functions of inducing crystallization of the polymer from the liquid state and enhancing the initiation of polymer crystallization sites so as to speed up the crystallization of the polymer. Thus, the nucleating agent may be a solid at the crystallization temperature of the polymer. Because the nucleating agent increases the rate of crystallization of the polymer, the size of the resultant polymer particles, or spherulites, is reduced. When the nucleating agent is used to form the microporous materials of the present invention, greater amounts of diluent compound can be used relative to the propylene-containing polymer forming the microporous materials.

Further, because a beta-nucleating agent is employed in the present invention, the resultant particles of propylene-containing polymer are reduced in size over the size the particles would have if no nucleating agent were employed. It will be understood, however, that the precise particle size obtained will depend upon the precise additive, component concentrations, and processing conditions employed. Because reduction in particle size results in more particles, the number of fibrils per unit volume is also increased. Moreover, the length of the fibrils is increased when a beta-nucleating agent is employed than when no nucleating agent is used because of the greater stretchability that can be achieved. Similarly, the tensile strength of the resultant microporous materials is greatly increased. Hence, by employing a beta-nucleating agent, more useful microporous materials can be prepared than when nucleating agents are not present.

C. Diluent Compound

Diluent compounds suitable for blending with the crystallizable propylene-containing polymer to make the microporous materials of the present invention are materials in which the crystallizable polymer will dissolve to form a solution above the melting temperature of the crystallizable polymer, but will phase separate on cooling at or below the crystallization temperature of the crystallizable polymer. Preferably, the diluent has a boiling point at atmospheric pressure that is at least as high as the melting temperature of the crystallizable polymer. However, diluents having lower boiling points can be used when super-atmospheric pressure is employed to elevate the boiling point of the diluent to a temperature at least as high as the melting temperature of the crystallizable polymer.

Generally, suitable diluents have a solubility parameter and a hydrogen bonding parameter within a few units of the values of these same parameters for the crystallizable polymer. A particular combination of polymer and diluent may include more than one polymer, i.e., a mixture of two or more polymers and/or more than one diluent. Mineral oil and mineral spirits are examples of mixtures of diluents, since they are typically blends of hydrocarbon liquids. Similarly, blends of liquids and solids may also serve as the diluent. Some examples of solid diluents include hydrocarbon waxes and petroleum jelly. Some examples of blends of crystallizable propylene-containing polymers and diluents, respectively, that are useful in preparing microporous materials in accordance with the present invention include: polypropylene with mineral oil, dioctylphthalate, paraffin wax, petroleum jelly, or mineral spirits; a mixture of polypropylene and polyethylene with mineral oil or mineral spirits; polypropylene-polyethylene copolymer with mineral oil. The quantity of diluent is typically from about 20 to about 70 parts, more typically from about 30 to 70 parts, and even more typically from about 50 to 65 parts by weight based upon the total weight of the polymer and diluent.

D. Additional Ingredients

Additional ingredients may be included, such as melt additives. These melt additives can be surfactants, surface active agents, antistatic agents, ultraviolet radiation absorbers, antioxidants, organic or inorganic colorants, stabilizers, flame retardants, fragrances, plasticizers, antimicrobial agents, repellents, and antifouling compounds, for example.

E. Microporous Articles

A preferred article according to the present invention is in the form of a sheet or film, although other article shapes are contemplated and may be formed. For example, the article may be in the form of a tube or filament. Other shapes that can be made according to the disclosed process are also intended to be within the scope of the invention.

The microporous materials of the present invention can be employed in a wide variety of situations where their microporous structures are useful. Microporous articles may be free-standing films or may comprise structures that have the microporous layers of the invention affixed to a substrate, such as structures made from materials that are polymeric, woven, nonwoven, foil or foam, or a combination thereof depending on the application. The microporous films may be used in such diverse applications as the ultra filtration of colloidal matter, as diffusion barriers, as face oil removers, as diffuse light reflectors, or as separators in electrochemical cells. Further, they may be laminated to various substrates and the laminate may be utilized to form such articles as raincoats or other outerwear or camping equipment such as tents and sleeping bags. The microporous sheets of the present invention can be laminated to a woven cloth or a non-woven fabric such as a non-woven scrim. This scrim may be used to produce a disposable protective garment for use in a hospital or in an electronic clean room or in other areas such as where caustic chemical spills may be a problem. Laminates made with the microporous sheets may also be used to hold gels, fluids and mixtures that can be delivered to other surfaces by actions such as, for example, contacting, wiping, smearing or rubbing.

The microporous sheet materials may be further utilized as filtering materials for cleaning antibiotics, beer, oils, bacteriological broths, for sample collection in air analysis, and for collecting microbiological specimens. They may also be utilized to make surgical dressings, bandages, and in other medical applications. In addition, they may be used as printable substrates. Those of ordinary skill in the art will recognize that there are many other uses for microporous materials made in accordance with the present invention.

F. Production Methods

Production of microporous articles in accordance with the current invention comprises melt blending a crystallizable propylene-containing polymer with the beta-nucleating agent and a diluent. After the materials have been blended they are formed into a shape, and cooled to a temperature at which the beta-nucleating agent induces the propylene-containing polymer to crystallize so as to induce phase separation between the propylene-containing polymer and the diluent. In this manner an article is formed comprising an aggregate of a first phase comprising semi-crystalline polymer and a second phase of the diluent compound. Adjacent particles of polymer are distinct, but they have a plurality of zones of continuity. That is, the polymer particles are generally surrounded or coated by the diluent, but not completely. There are areas of contact between adjacent polymer particles where there is a continuum of polymer from one particle to the next adjacent particle in such zones of continuity. The formed article (before at least one of at least partial diluent removal or stretching) is solid and generally transparent. The particles may be described as spherulites and aggregates of spherulites of the polymer, with diluent occupying the space between particles.

Thereafter the article is typically stretched in at least one direction to provide a network of interconnected micropores throughout the article. The stretching step normally comprises biaxially stretching the shaped article. The stretching step provides an area increase in the shaped article of from about 10% to over 1200% over the original area of the shaped article.

On stretching, the polymer particles are pulled apart, permanently attenuating the polymer in zones of continuity, thereby forming fibrils and minute voids between coated particles, and creating a network of interconnected micropores. Such permanent attenuation also renders the article permanently opaque. Also on stretching, if the diluent is not removed, the diluent either remains coated on or at least partially surrounds the surface of the resultant porous propylene-containing polymer phase. The diluent may be removed at least partially. Removal can be accomplished by known techniques such as washing and drying. If performed before stretching or in place of stretching, the resulting film is opaque. If diluent removal is performed before or after stretching, the resulting film remains opaque and is more porous than a film that has only been stretched. Additional stretching may also be done to improve film strength characteristics. This can result in films with improved tear resistance.

The attainment of the microporous materials of the present invention is dependent in part upon the rate of cooling and the type and amount of nucleating agent employed. During cooling, heat is removed from the melt-blended mixture until the crystallization temperature of the crystallizable polymer in the melt-blended mixture is reached, and solidification and phase separation of the polymer can begin. Cooling temperatures greater than about 225° C. below the equilibrium melting point of the pure crystallizable polymer cause too rapid quenching of the melt blended mixture and can result in single phase films, which, although transparent, are substantially incapable of being rendered uniformly microporous by at least one of stretching or diluent removal. Cooling at temperatures of less than about 35° C. below the equilibrium melting point of the pure crystallizable polymer are less preferred. This results in articles that are typically physically weak. For example, a common film-forming polypropylene typically melts at about 176° C. Beta-nucleating agents can nucleate propylene polymer crystals at temperatures between about 140° C. and 60° C. In contrast, other nucleating agents such as dibenzylidine sorbitol typically are able to nucleate propylene crystals at temperatures only between about 110° C. and 60° C.

Reference will now be made to the apparatus of FIG. 1 in order to illustrate one method for practicing the present invention. At least one crystallizable propylene-containing polymer and beta-nucleating agent are first dry blended together at room temperature and then introduced into hopper 12 of extruder apparatus 10. Optionally the nucleating agent may be added separately as long as adequate mixing between the agent and the polymer is allowed to occur. At least one diluent is fed by suitable feeding device 13 into extruder 10 via port 11 at a point in the extruder wall between hopper 12 and extruder exit 17. The components form a melt comprising a solution of polymer and diluent with nucleating agent uniformly dispersed throughout the solution. The nucleating agent may be a dispersed solid or liquid that is either in solution or uniformly dispersed into immiscible phases within the solution. The extruder preferably has a number of zones that are heated at decreasing temperatures towards extruder exit 17. The melt is heated to a temperature of at least about 25° C. above the melting temperature of the crystallizable polymer (but below the thermal degradation temperature of the polymer). The melt then passes through a filter to remove particles having sizes sufficiently large to either prevent later formation of microporous film or that will appear as undesirable cosmetic defects. For example, if the microporous film is stretched and the ultimate film thickness is between 12 and 150 microns, the size of the particles to be removed have diameters of above at least 5 microns, preferably above 2 microns.

The filtered melt is then passed into shape-forming die 19. The die may be a slot die or an annular die. Preferably a slot die is used having a slit gap of about 25 to about 1000 micrometers. Alternatively, the die may be an annular die suitable for making tubular or blown films. Either die can be used to shape the melt into a formed melt.

The formed melt is then quenched to form a construction having at least two phases. Quenching may occur by passing the formed melt over casting roll 22. The casting roll typically maintained at a suitable temperature below the crystallization temperature of the crystallizable polymer to permit formation of a construction having at least two phases. The surface of the casting roll may be either (1) smooth, resulting typically in a polymer skin on the surface of the two-phase construction, or (2) patterned, resulting in little or no skin. Alternatively, quenching may be done with a fluid or air. The two-phase shaped melt construction may be passed through a quench bath containing a suitable coolant, e.g., water, maintained at a suitable temperature below the crystallization temperature of the crystallizable polymer. The melt construction may also be formed into a tube and quenched in air.

The two-phase film is then stretched. Stretching may be done in one direction by passing the film through down-web-direction stretching device 24 or cross-web-direction stretching device 26. Alternatively the film may be stretched in two directions perpendicular to each other by passing through both device 24 and device 26 or by passing through a simultaneous biaxial orienter known to the art. The film may then be passed to take-up roller 28 for winding into a roll.

In addition, or alternatively, at least some of the diluent may be removed from the film. Diluent removal may occur before any stretching occurs, after stretching occurs, or in place of stretching. The diluent may be removed from the microporous sheet before or instead of stretching to provide a unique microporous sheet material formed primarily of the polymeric material with beta-nucleating agent incorporated therein. If the microporous film is stretched after diluent removal, a more tear-resistant film typically results. A more porous film results when both stretching and diluent removal is performed than when only one of stretching and diluent removal is performed for a polymer/diluent system polymeric material.

Diluent may be removed by solvent extraction, volatilization, or any other convenient method known to the art. Once the diluent has been removed, the resultant microporous sheet may be imbibed, if desired, with various materials to provide any one of a variety of specific functions, thereby providing unique articles. For example, the imbibing material may be a liquid, solvent solution, solvent dispersion, or solid. Such materials may be crosslinkable materials. They may be imbibed by any one of a number of known methods that result in the deposition of such materials within the porous structure of the microporous sheet. Some imbibing materials are merely physically placed within the microporous sheet. Some are crosslinked in place. In some instances, the use of two or more reactive components as imbibing materials permits their reaction within the microporous sheet structure. Examples of imbibing materials that might be employed in the present invention include medicaments, fragrances, antistatic agents, surfactants, pesticides, and solid particulate materials such as activated carbon and pigments. Certain materials, such as antistatic agents or surfactants, may be imbibed after pores are created by stretching and without removal of the diluent.

The microporous sheet material, either before or after removal of the diluent, may be further modified by the deposition thereon of any one of a variety of compositions, by any one of a variety of known coating or deposition techniques. For example, the microporous sheet material may be coated with metal by vapor deposition or sputtering techniques, or it may be coated with adhesives, aqueous or solvent-based coating compositions, or dyes. Coating may be accomplished by such other conventional techniques such as roll coating, spray coating, dip coating, or any other known coating techniques. Sheets of the microporous material may be coated, for example, with an antistatic material by conventional wet coating or vapor coating techniques. Specific deposition techniques employed will depend on whether the microporous film surface is smooth or patterned and symmetrically or asymmetrically shaped.

G. EXAMPLES

Objects and advantages of this invention are further illustrated by the following examples, but the particular materials and amounts thereof recited in these examples, as well as other conditions and details, should not be construed to unduly limit this invention. All parts are by weight unless otherwise stated.

Test Methods

Thickness. This value is measured in micrometers using a TMI direct contact gauge (available from Testing Machines Inc., Woburn, Mass.).

Gurley air flow. This value is a measurement of time in seconds (sec) required to pass 50 cubic centimeters (cc) of air through a material area of 64.5 square millimeters ($mm^2$) (0.1 square inches) according to ASTM D-726 Method B. These "Gurley seconds" are therefore related to flow resistance because the higher the value, the higher the flow resistance.

Porosity. Porosity is a value calculated from the measured bulk density and polymer density using the following equation:

$$Porosity = (1 - bulk\ density/polymer\ density) \times 100$$

The bulk density is determined by dividing the weight of a 47 mm diameter sample containing eight film layers by its thickness and accounting for its area conversion factor.

Void Volume. Void volume is a value calculated from the calculated porosity and the measured thickness using the following equation:

$$Void\ Volume = (0.254 * porosity\ (\%) * thickness\ (mils))/100$$

The value 0.254 is a conversion factor constant. The units of void volume are $cc/100\ cm^2$.

Pore Size. Pore size values represent the largest effective pore size measured in microns. The pore size is determined by measuring the bubble point according to ASTM-F-316-80.

Tensile Properties. A sample 2.5 cm×10.2 cm (1 inch×4 inches) is cut in either the down-web direction (DW) or the cross-web direction (CW) that is perpendicular to the DW. The bulk tensile strength and percent elongation at break were measured on an Instron Model 1122 according to ASTM-D-882.

Example 1 and Comparative Example 1

This example illustrates the effect of the concentration of beta-nucleating agent on performance properties of a microporous film.

For Sample A, a melt composition was formed by adding (1) 65 parts crystallizable polymer (polypropylene DS 5D45, 0.6–0.8 melt flow index, available from Union Carbide Corp., Danbury, Conn.), (2) 35 parts diluent (mineral oil available as White Mineral Oil #31, available from Chevron Products Company, San Francisco, Calif.) and (3) a melt-blended mixture containing 0.007 parts of Beta-Nucleating Agent A (a Gamma-Quinacridone available as Hostaperm E3B Red permanent pigment from Clariant, Minneapolis, Minn.) based on 100 parts of crystallizable polymer into a 25 mm co-rotating twin screw extruder (available as model ZE 25A from Berstorff, Charlotte, N.C.). The diluent was fed into the extruder through an injection port. The melt-blended mixture was a master batch that was formed by previously melt mixing 96 parts of a carrier polymer (polypropylene, 2.5 melt flow index, available as Fina 3374 from Fina Oil & Chemical, Dallas, Tex.) and 4 parts of the beta-nucleating agent. The overall feed rate of all components was 2.0 kg/hr. The temperature in zones 1–6 of the extruder was maintained at about 204° C., 271° C., 271° C., 232° C., 216° C., and 216° C., respectively. The screw speed was 150 rpm.

The melt composition was then formed into a microporous film by passing the composition through a filter and pumping it through a 30 mm film die onto a cooled patterned casting wheel to form a cast film having a thickness of about 64 microns (2.5 mils). The casting wheel temperature was maintained at about 66° C. (150° F.). The cast film was then biaxially-stretched 2:1×2:1 on a TM Long Stretcher available from TM Long Co., Inc., Somerville, N.J. at about 107° C. (225° F.).

Sample B was made as Sample A except the amount of beta-nucleating agent was increased. A sufficient amount of melt-blended mixture was added to Sample B to result in the presence of 0.13 parts beta-nucleating agent per 100 parts of crystallizable polymer.

Sample C was made as Sample B except 2.0 parts (based on the weight of the total materials in the melt composition) of a melt-additive (sorbitan monolaurate, available as Span-20 from Ruger Chemical Company, Irvington, N.J.) was added in zone 1 of the extruder.

Comparative Example 1 was made as Sample C except an alpha-nucleating agent (dibenzylidine sorbitol available as Millad 3905 from Milliken Chemical) was used at 0.065 parts by weight per 100 parts of polymer.

Each of the above film samples were tested for total thickness, Gurley, Porosity, Void Volume, Pore Size, DW Break Strength, DW Elongation, CW Break Strength and CW Elongation. Processing conditions and test results are shown in Tables 1A and 1B.

TABLE 1A

| Example | 1A | 1B | 1C | CE1 |
|---|---|---|---|---|
| Polymer:Diluent | 65:35 | 65:35 | 65:35 | 65:35 |
| Nucleating Agent (NA) | beta A | beta A | beta A | Millad |
| NA parts/100 parts polymer | 0.007 | 0.013 | 0.013 | 0.065 |
| Melt additive, parts | none | none | 2.0 | 2.0 |
| Total Flow Rate, kg/hr | 2.0 | 2.0 | 2.0 | 2.0 |

TABLE 1B

| Ex. | Thickness microns | Gurley sec/50 cc | Porosity % | Void Vol. cc/100 cm$^2$ | Pore Size micron | DW Break MPa | DW Elong. % | CW Break Mpa | CW Elong. % |
|---|---|---|---|---|---|---|---|---|---|
| 1A | 38 | 44 | 36 | 0.14 | 0.27 | 17.7 | 170 | 16.5 | 115 |
| 1B | 41 | 212 | 29 | 0.12 | 0.42 | 21.2 | 255 | 19.3 | 255 |
| 1C | 41 | 38 | 27 | 0.11 | 0.38 | 16.7 | 270 | 17.5 | 205 |
| CE1 | 41 | * | * | * | * | * | * | * | * |

*Film was too weak be made porous by either stretching or washing.

As seen in Table 1, microporous films having desirable porosity and film properties can be made with a beta-nucleating agent. In addition, film strength is not significantly altered by the addition of a melt additive.

X-ray diffraction analysis of Sample A and B showed the presence of beta structure polypropylene in the cast microporous film before the film was stretched. Similar analysis of Sample C, containing a melt additive, showed the presence of an alpha crystalline structure in the cast film form. Sample CE1, which used an alpha-nucleating agent, did not produce an acceptable film.

Example 2

This example illustrates the effect of the concentration of beta-nucleating agent and casting roll temperature on performance properties of a porous film.

Sample A was made in the same manner as Example 1A except a different extruder and die were used, different process conditions were used, the beta-nucleating agent concentration was changed and stretching was done in-line. The extruder was a 40 mm twin-screw extruder (available as model ZE 40, available from Berstdorff) having 8 zones of independent temperature control. The overall feed rate was 10.4 kg/hr. The temperature in zones 1–8 of the extruder was maintained at about 204° C., 271° C., 271° C., 232° C., 216° C., 216° C., 216° C., and 216° C., respectively. The screw speed was 150 rpm. A 36 mm film die was used to form a cast film having a thickness of about 64 microns. Stretching was done in a continuous manner with a length orienter followed by a cross-direction stretching oven. Resulting stretching was 1.7:1×1.7:1.

Sample B–G were made in a manner similar to Sample A except some process conditions such as ratio of polymer to diluent, parts beta-nucleating agent, and casting roll temperature were different.

Process conditions are shown in Table 2.

TABLE 2A

| Example | Polymer:Diluent Ratio | Nucleating Agent type | Pts/100 pts | Casting Temp ° C. (° F.) |
|---|---|---|---|---|
| 2A | 65:35 | beta A | 0.020 | 66 (150) |
| 2B | 65:35 | beta A | 0.020 | 68 (155) |
| 2C | 65:35 | beta A | 0.020 | 71 (160) |
| 2D | 65:35 | beta A | 0.020 | 74 (165) |

TABLE 2A-continued

| Example | Polymer:Diluent Ratio | Nucleating Agent type | Pts/100 pts | Casting Temp ° C. (° F.) |
|---|---|---|---|---|
| 2E | 65:35 | beta A | 0.007 | 79 (175) |
| 2F | 55:45 | beta A | 0.006 | 79 (175) |
| 2G | 45:55 | beta A | 0.014 | 85 (185) |

Each of the above film samples were tested for total thickness, Gurley, Porosity, Void Volume and Pore Size. Test results are shown in Table 2B.

TABLE 2B

| Example | Thickness microns | Gurley sec/50 cc | Porosity % | Void Vol cc/100 sq cm | Pore Size micron |
|---|---|---|---|---|---|
| 2A | 39 | 17 | 41 | 0.16 | 0.53 |
| 2B | 38 | 15 | 41 | 0.16 | 0.58 |
| 2C | 39 | 29 | 40 | 0.16 | 0.45 |
| 2D | 38 | 55 | 38 | 0.15 | 0.49 |
| 2E | — | >30,000 | — | — | — |
| 2F | 42 | 17 | 37 | 0.16 | 0.83 |
| 2G | 38 | 722 | 29 | 0.11 | 0.18 |

In Sample 2E, the pore structure was so tightly configured (due to the large number of spherulites) that air could not pass through the film.

As seen in Table 2B, the nucleating capability of the beta-nucleating agent and resulting porosity characteristics are influenced by the casting wheel temperature, the beta-nucleating agent concentration, and the ratio of crystallizable polymer to diluent. The beta crystals in the polypropylene phase can be transformed to the more standard alpha-form crystals by exposure to additional processing, i.e., stretching under heat. However, X-ray diffraction analysis of Sample F–G showed the presence of beta structure polypropylene in the cast film before the film was stretched.

Example 3

This example illustrates the effect of varying ratios of crystallizable polymer to diluent on microporous film properties.

In sample A–D, film was made as in Example 2A except the crystallizable polymer to diluent ratio and the casting roll temperature were varied. See Table 3 for crystallizable polymer to diluent ratios. Sample A–C were made with a casting wheel temperature of 66° C. (150° F.). Sample D was made with a casting wheel temperature of 85° C. (185° F.).

Each of the film samples outlined below were tested for total thickness, Gurley, Porosity, Void Volume and Pore Size. Test results are also shown in Table 3.

TABLE 3

| Example | P:D Ratio | Cast. Wheel temp ° C. (° F.) | Thickness microns | Gurley sec/50 cc | Porosity % | Void Vol. cc/100 cm$^2$ | Pore Size micron |
|---|---|---|---|---|---|---|---|
| 3A | 65:35 | 66 (150) | 40 | 29 | 37 | 0.15 | 0.39 |
| 3B | 60:40 | 66 (150) | 42 | 9 | 43 | 0.18 | 0.69 |
| 3C | 45:55 | 66 (150) | * | * | * | * | * |
| 3D | 45:55 | 85 (185) | 38 | 722 | 29 | 0.11 | 0.18 |

*Sample 3C was too weak to test for properties.

As seen in Table 3, the microporous films of the invention may be made at various P:D ratios, but at some point in decreasing the ratio, the casting wheel temperature will need to be increased to obtain good film properties.

Example 4

This example illustrates the effect of other beta-nucleating agents on performance properties of a microporous film.

Beta-nucleating Agent B (a calcium salt of suberic acid) and beta-nucleating Agent C (a calcium salt of pimelic acid) are disclosed in Examples 2–5 of U.S. Pat. No. 5,681,922 (Wolfschwenger et al.).

Sample A was made as Example 1A except Beta-Nucleating Agent B was used, the concentration of the beta-nucleating agent was different and the film was stretched at 135° C. (275° F.).

Sample B–C were made as Sample A except either the casting roll temperature was changed or a melt additive was added (Span-20).

Sample D was made as Example 1A except beta-nucleating Agent C was used, the concentration of the beta-nucleating agent was different and the film was stretched at 135° C. (275° F.).

Sample E–F were made as Sample A except a different concentration of beta-nucleating agent was used, the casting roll temperature was changed and a melt additive was added (Span-20) but only to Sample F.

Process conditions are shown in Table 4A.

TABLE 4A

| Example | Polymer:Diluent Ratio | Nucleating Agent type | Nucleating Agent pts/100 pts | Melt Add parts | Casting Temp °C. (°F.) |
|---|---|---|---|---|---|
| 4A | 65:35 | beta B | 0.013 | none | 66 (150) |
| 4B | 65:35 | beta B | 0.013 | none | 93 (200) |
| 4C | 65:45 | beta B | 0.013 | 1.75 | 93 (200) |
| 4D | 65:35 | beta C | 0.020 | none | 93 (200) |
| 4E | 65:35 | beta C | 0.020 | 1.75 | 93 (200) |
| 4F | 65:35 | beta C | 0.003 | none | 93 (200) |

Each of the above film samples was tested for total thickness, Gurley, Porosity, and Void Volume. Test results are shown in Table 4B.

TABLE 4B

| Example | Thickness microns | Gurley sec/50 cc | Porosity % | Void Vol cc/100 sq cm |
|---|---|---|---|---|
| 4A | 38 | 7 | 46 | 0.18 |
| 4B | 41 | 850 | 25 | 0.10 |
| 4C | 41 | 645 | 36 | 0.15 |
| 4D | 39 | 1031 | 17 | 0.07 |
| 4E | 40 | 15 | 45 | 0.18 |
| 4F | 40 | 161 | 53 | 0.22 |

As seen in Table 4B, microporous films were made using different beta-nucleating agents.

X-ray diffraction analysis of Sample A–F showed the presence of beta structure polypropylene in the cast film before the film was stretched. The beta structure was not observed in samples A and D after they had been stretched under heat.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. A microporous material comprising:
    a crystallizable propylene-containing polymer;
    a beta-nucleating agent; and
    a diluent that is miscible with the polymer at a temperature above the melting temperature of the polymer and that phase separates from the polymer at a temperature below the polymer crystallization temperature.

2. The microporous material of claim 1, wherein the beta-nucleating agent is selected from the group consisting of gamma quinacridone; aluminum salt of quinizarin sulphonic acid; dihydroquinoacridin-dione; quinacridin-tetrone; triphenenol ditriazine; the combination of calcium carbonate and organic acids; the combination of calcium stearate and pimelic acid; calcium silicate; dicarboxylic acid salts of metals of Group IIA of the periodic table; delta-quinacridone; diamides of adipic or suberic acids; calcium salts of suberic or pimelic acid; indigosol or cibantine organic pigments; quinacridone quinone; N',N'-dicyclohexil-2,6-naphthalene dicarboxamide; antraquinon red pigments; and bis-azo yellow pigments.

3. The microporous material of claim 1, wherein the beta-nucleating agent is selected from the group consisting of gamma quinacridone, the calcium salt of suberic acid, and the calcium salt of pimelic acid.

4. The microporous material of claim 1, wherein the beta-nucleating agent comprises less than 0.1 parts by weight per 100 parts of polymer.

5. The microporous material of claim 1, further comprising melt additives.

6. The microporous material of claim 5, wherein the melt additives are selected from the group consisting of surfactants, surface active agents, antistatic agents, ultraviolet radiation absorbers, antioxidants, organic or inorganic colorants, stabilizers, flame retardants, fragrances, plasticizers, anti-microbial agents, repellents, and antifouling compounds.

7. The microporous material of claim 1, wherein the microporous material contains a plurality of polymeric particles joined by fibrils.

8. The microporous material of claim 7, wherein the particles contain sufficient beta-nucleating agent such that the length of the fibrils is significantly increased over the fibril length the microporous material would have if no nucleating agent were present.

9. The microporous material of claim 7, wherein the particles contain sufficient beta-nucleating agent such that the tensile strength of the microporous material is significantly increased over the tensile strength the microporous material would have if no nucleating agent were present.

10. The microporous material of claim 7, wherein the particles contain sufficient beta-nucleating agent such that the stretchability of the material is significantly increased over the stretchability the material would have if no nucleating agent were present.

11. A microporous polymeric material, the material prepared by:
    (a) forming a melt solution comprising a crystallizable propylene-containing polymer, a beta-nucleating agent, and a diluent; wherein the diluent is miscible with the polymer at a temperature above the melt temperature of the polymer but phase separates from the polymer when cooled below the crystallization temperature of the polymer;
    (b) cooling the melt solution to a temperature where phase separation occurs by crystallization precipitation of the polymer component to form a phase comprising network of polymer particles connected to each other by tie fibrils and a diluent phase; and
    (c) creating interconnected micropores by either orienting the material in at least one direction to separate adjacent crystallized polymer particles from one another, or by removing at least a portion of the diluent from the material.

12. The microporous material of claim 11, wherein the beta-nucleating agent is selected from the group consisting of gamma quinacridone; aluminum salt of quinizarin sulphonic acid; dihydroquinoacridin-dione; quinacridin-tetrone; triphenenol ditriazine; the combination of calcium carbonate and organic acids; the combination of calcium stearate and pimelic acid; calcium silicate; dicarboxylic acid salts of metals of Group IIA of the periodic table; delta-quinacridone; diamides of adipic or suberic acids; calcium salts of suberic or pimelic acid; indigosol or cibantine organic pigments; quinacridone quinone; N',N'-dicyclohexil--naphthalene dicarboxamide; antraquinon red pigments; and bis-azo yellow pigments.

13. A method of making a microporous article, comprising the steps of:
    (a) melt blending to form a mixture comprising:
        (i) about 30 to about 80 parts by weight of crystallizable propylene-containing polymer, (ii) a sufficient amount of a beta-nucleating agent to initiate subsequent nucleation of crystals of the propylene-containing polymer at a significantly greater number of crystallization sites as compared to crystallization without a nucleating agent, and (iii) about 20 to about 70 parts by weight of a diluent with which the propylene-containing polymer is miscible and into which the propylene-containing polymer will dissolve at the melting temperature of the propylene-containing polymer but from which the propylene-containing polymer will phase separate on cooling to a temperature at or below the crystallization temperature of the propylene-containing polymer;

(b) shaping the melt blended mixture;

(c) cooling the shaped mixture to a temperature at which the beta-nucleating agent initiates crystallization within the propylene-containing polymer so as to cause phase separation between the diluent and polymer particles connected to each other by tie fibrils, thereby providing an article comprising an aggregate of crystallized propylene-containing polymer in the diluent; and (d) increasing the porosity of the article by one or both of stretching the shaped article in at least one direction and removing at least a part of the diluent.

14. The method of claim 13, wherein the amount of beta-nucleating agent is from about 0.002 to 0.1 parts by weight per 100 parts of polymer and diluent.

15. The method of claim 13, wherein the particles contain enough of the beta-nucleating agent such that the number of fibrils per unit volume is significantly increased over the number of fibrils per unit volume that would exist between particles if no nucleating agent were present.

16. A microporous article comprising:

a microporous material containing a crystallizable propylene-containing polymer, a beta-nucleating agent, and a diluent that is miscible with the polymer at a temperature above the melting temperature of the polymer and that phase separates from the polymer at a temperature below the polymer crystallization temperature; and a substrate on which the microporous material is deposited.

17. The microporous article of claim 16, wherein the substrate comprises a structure made from materials selected from the group consisting of polymeric, woven, nonwoven, foil or foam, or a combination thereof.

18. The microporous material of claim 16, wherein the beta-nucleating agent is selected from the group consisting of gamma quinacridone; aluminum salt of quinizarin sulphonic acid; dihydroquinoacridin-dione; quinacridin-tetrone; triphenenol ditriazine; the combination of calcium carbonate and organic acids; the combination of calcium stearate and pimelic acid; calcium silicate; dicarboxylic acid salts of metals of Group II of the periodic table; delta-quinacridone; diamides of adipic or suberic acids; calcium salts of suberic or pimelic acid; indigo sol or cibantine organic pigments; quinacridone quinone; N',N'-dicyclohexil-2,6-naphthalene dicarboxamide; antraquinon red pigments; and bis-azo yellow pigments.

* * * * *

UNITED STATES PATENT AND TRADEMARK OFFICE
CERTIFICATE OF CORRECTION

PATENT NO. : 6,632,850 B2
DATED : October 14, 2003
INVENTOR(S) : Karim, Naimul

It is certified that error appears in the above-identified patent and that said Letters Patent is hereby corrected as shown below:

Title page,
Item [56], References Cited, OTHER PUBLICATIONS,
"Varga, J." reference, delete "Polyporpylene" and insert in place thereof
-- Polypropylene --.
"Mubarak, Y." reference, delete "Polypropylen" and insert in place thereof
-- Polypropylene --.
"L. Jinjiang" reference, delete "Polypropylens" and insert in place thereof
-- Polypropylene --.
N. Ikeda" reference, delete "Nuleator" and insert in place thereof -- Nucleator --; delete
delete "Polypropylens" and insert in place thereof -- Polypropylene --.
"J. Varga" reference, delete "Polypropylens" and insert in place thereof
-- Polypropylene --.

Column 5,
Line 37, delete "effect" and insert in place thereof -- affect --.
Lines 56-57, delete "triphenenol" and insert in place thereof -- triphenol --.
Line 63, delete "quiancridone" and insert in place thereof -- quinacridone --.
Line 64, delete "dicyclohexil" and insert in place thereof -- dicyclohexiyl --.

Column 6,
Line 2, delete "polycarboxilic" and insert in place thereof -- polycarboxiylic --.
Line 19, delete "would have if" and insert in place thereof -- would have been if --.

Column 9,
Lines 26-27, delete "roll typically" and insert in place thereof -- roll is typically --.

Column 12,
Table 1B, delete "too weak be" and insert in place thereof -- too weak to be --.
Line 58, delete "Berstdorff" and insert in place thereof -- Berstorff --.

Column 13,
Lines 1 and 66, delete "Sample" and insert in place thereof -- Samples --.

Column 14,
Line 6, delete "sample" and insert in place thereof -- Samples --.
Lines 10, 54 and 64, delete "Sample" and insert in place thereof -- Samples --.

UNITED STATES PATENT AND TRADEMARK OFFICE
CERTIFICATE OF CORRECTION

PATENT NO. : 6,632,850 B2
DATED : October 14, 2003
INVENTOR(S) : Karim, Naimul

It is certified that error appears in the above-identified patent and that said Letters Patent is hereby corrected as shown below:

Column 15,
Line 55, delete "triphenenol" and insert in place thereof -- triphenol --.
Line 62, delete "hexil" and insert in place thereof -- hexyl --.

Column 16,
Line 54, delete "triphenenol" and insert in place thereof -- triphenol --.
Line 61, delete "hexil" and insert in place thereof -- hexyl --.

Column 18,
Line 22, delete "triphenenol" and insert in place thereof -- triphenol --.
Line 29, delete "hexil" and insert in place thereof -- hexyl --.

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,632,850 B2
DATED : October 14, 2003
INVENTOR(S) : Karim, Naimul

It is certified that error appears in the above-identified patent and that said Letters Patent is hereby corrected as shown below:

Title page,
Item [56], References Cited, OTHER PUBLICATIONS,
"Varga, J." reference, delete "Polyporpylene" and insert in place thereof
-- Polypropylene --.
"Mubarak, Y." reference, delete "Polypropylen" and insert in place thereof
-- Polypropylene --.
"L. Jinjiang" reference, delete "Polypropylens" and insert in place thereof
-- Polypropylene --.
N. Ikeda" reference, delete "Nuleator" and insert in place thereof -- Nucleator --;
delete "Polypropylens" and insert in place thereof -- Polypropylene --.
"J. Varga" reference, delete "Polypropylens" and insert in place thereof
-- Polypropylene --.

Column 5,
Line 37, delete "effect" and insert in place thereof -- affect --.
Lines 56-57, delete "triphenenol" and insert in place thereof -- triphenol --.
Line 63, delete "quiancridone" and insert in place thereof -- quinacridone --.
Line 64, delete "dicyclohexil" and insert in place thereof -- dicyclohexyl --.

Column 6,
Line 2, delete "polycarboxilic" and insert in place thereof -- polycarboxylic --.
Line 19, delete "would have if" and insert in place thereof -- would have been if --.

Column 9,
Lines 26-27, delete "roll typically" and insert in place thereof -- roll is typically --.

Column 12,
Table 1B, delete "too weak be" and insert in place thereof -- too weak to be --.
Line 58, delete "Berstdorff" and insert in place thereof -- Berstorff --.

Column 13,
Lines 1 and 66, delete "Sample" and insert in place thereof -- Samples --.

Column 14,
Line 6, delete "sample" and insert in place thereof -- Samples --.
Lines 10, 54 and 64, delete "Sample" and insert in place thereof -- Samples --.

UNITED STATES PATENT AND TRADEMARK OFFICE
CERTIFICATE OF CORRECTION

PATENT NO. : 6,632,850 B2
DATED : October 14, 2003
INVENTOR(S) : Karim, Naimul

It is certified that error appears in the above-identified patent and that said Letters Patent is hereby corrected as shown below:

Column 15,
Line 55, delete "triphenenol" and insert in place thereof -- triphenol --.
Line 62, delete "hexil" and insert in place thereof -- hexyl --.

Column 16,
Line 54, delete "triphenenol" and insert in place thereof -- triphenol --.
Line 61, delete "hexil" and insert in place thereof -- hexyl --.

Column 18,
Line 22, delete "triphenenol" and insert in place thereof -- triphenol --.
Line 29, delete "hexil" and insert in place thereof -- hexyl --.

This certificate supersedes Certificate of Correction issued July 27, 2004.

Signed and Sealed this

Twenty-first Day of September, 2004

JON W. DUDAS
*Director of the United States Patent and Trademark Office*